B. BRYNTESON.
PUMP OPERATING MECHANISM.
APPLICATION FILED JUNE 8, 1918.
1,319,641.
Patented Oct. 21, 1919.
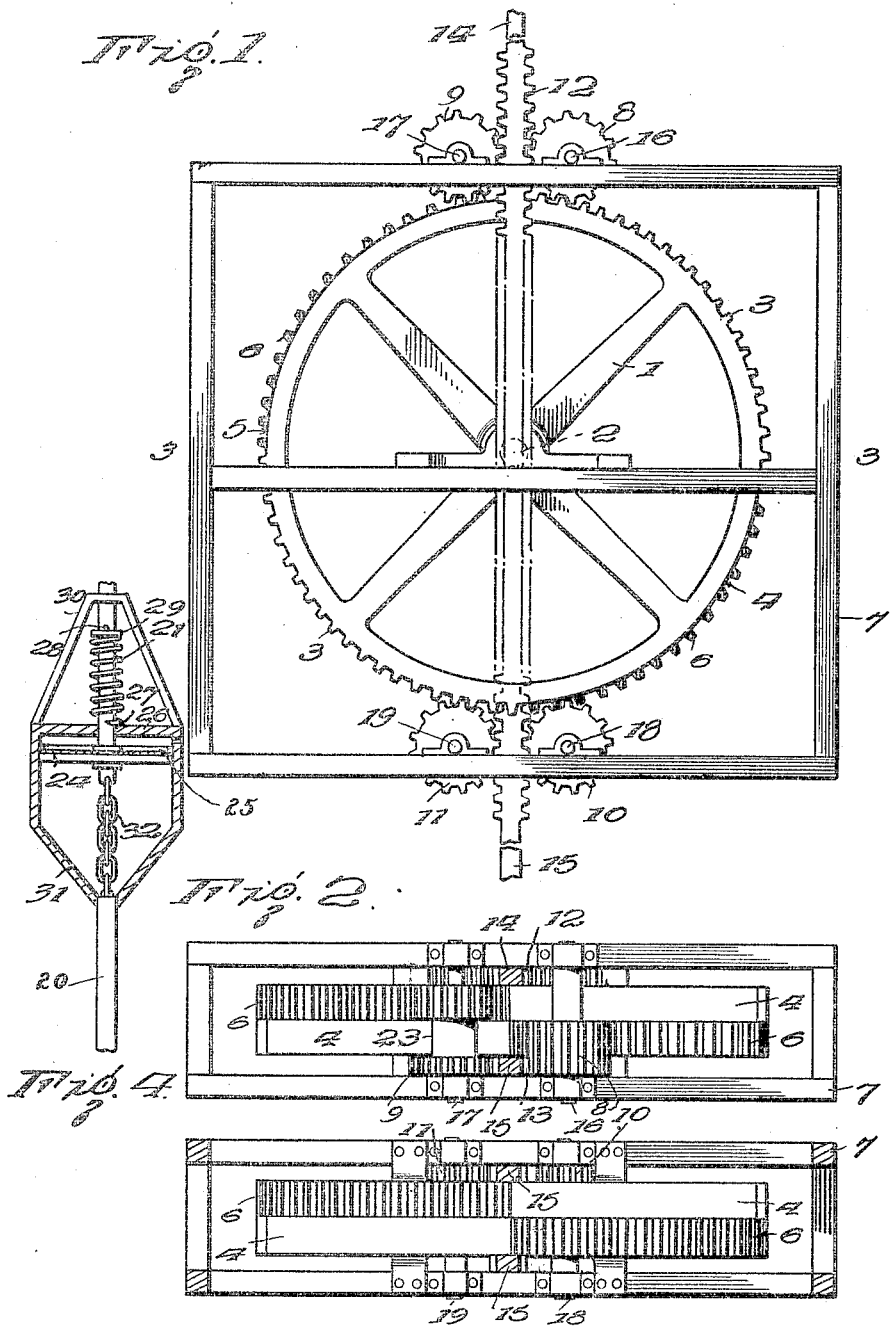

UNITED STATES PATENT OFFICE.

BRYNTE BRYNTESON, OF ODEBOLT, IOWA.

PUMP-OPERATING MECHANISM.

1,319,641.   Specification of Letters Patent.   Patented Oct. 21, 1919.

Application filed June 8, 1918. Serial No. 238,985.

*To all whom it may concern:*

Be it known that I, BRYNTE BRYNTESON, citizen of the United States of America, residing at Odebolt, in the county of Sac and State of Iowa, have invented certain new and useful Improvements in Pump-Operating Mechanism, of which the following is a specification.

The invention relates to a pump operating mechanism.

The object of the present invention is to provide an exceedingly simple, practical and inexpensive pump operating mechanism of strong and durable construction adapted to reciprocate positively a pair of pump rods or stocks for operating a double acting pump.

With the above and other objects in view the invention consists in the construction and novel combination and arrangement of parts hereinafter fully described, illustrated in the accompanying drawing, and pointed out in the claims hereto appended, it being understood that various changes in the form, proportion, size and minor details of construction, within the scope of the appended claims may be resorted to without departing from the spirit or sacrificing any of the advantages of the invention.

In the drawing:

Figure 1 is a front elevation of a pump operating mechanism constructed in accordance with this invention;

Fig. 2 is a plan view of the same;

Fig. 3 is a transverse sectional view on the line 3—3 of Fig. 1;

Fig. 4 is a detail view of the pump rod cushioning device.

In the accompanying drawing in which is illustrated one embodiment of the invention, the pump operating mechanism comprises in its construction a master gear 1 mounted on a horizontal shaft 2 and provided at each side with two segmental or quadrant sets of gear teeth and intervening smooth substantially quadrant portions. The gear segments 3 and the smooth portions 4 are located at one side of the master gear 1 and the smooth portions 5 and gear segments 6 are located at the other side of the master gear 1. The gear segments of each side of the master gear occurs opposite the smooth portion of the other side of the master gear 1. The shaft 2 which is journaled in suitable bearings of a supporting frame 7 is designed to be connected with a motor or other suitable power for operating the master wheel for communicating motion to upper and lower pump rod actuating pinions 8, 9, 10 and 11 which mesh with racks 12 and 13 of pump rods 14 and 15. The pump rods which have the racks at opposite sides of them, extend above and below the master gear 1 and a pair of pinions is arranged above and below the said gear.

The pinions 9 and 10 have spaced gear portions to mesh with the master gear and with the co-acting pump rod, the spaced gear portions being separated by a reduced smooth or blank intermediate portion 23 to enable each of the said pinions 9 and 10 to mesh with the pump rod and with the master gear teeth at the opposite side from that at which the said pump rod is located and to clear the teeth with which they are not designed to mesh.

The pump rods are composed of upper and lower sections, each lower section 20 being connected with the upper section by means of a coiled spring 21 and an air cushioning device 22 to enable the pump rods to be reciprocated through the alternate meshing of the pinions with the master gear without jarring or injuring the pump or other device operated by the mechanism and without liability of breaking or injuring the pump rods.

The cushioning device 22 comprises a cylinder 23 receiving a piston 24 mounted on the upper section of the pump rod and equipped with a suitable packing 25. The cylinder is provided at its upper end with a head or end wall 26 having a central opening 27 through which passes the upper section of the pump rod or member, and the spring 21 which is sleeved on the upper section of the pump rod is interposed between the same and the cylinder for cushioning the parts, a suitable stop 28, such as a pin or key, being provided to hold the upper end of the spring. A washer 29 is interposed between the pin or key 28 and the upper end of the spring to form a seat for the latter. The cylinder is provided with an upper guide 30 preferably in the form of a yoke, and receiving the upper section of the pump rod. The lower end of the cylinder is provided with depending portions 31 converging downwardly and suitably secured to the upper end of the lower section of the pump rod. The upper and lower sections of the pump rod are connected by a chain 32 or other suitable flexible connection which permits a limited independent movement of the parts to enable the cushioning device to function.

What is claimed is:

1. Pump operating mechanism including a driving master gear provided at opposite sides with alternately arranged cogged and smooth portions, reciprocatory members provided with racks and pinions meshing with the racks and arranged to be engaged by the cogged portions of the master gear.

2. Pump operating mechanism including a master gear provided with alternately arranged smooth and cogged portions, pump rods extending above the master wheel and below the same and provided with racks and pinions meshing with the racks and arranged to be engaged by the cogged portions of the master gear whereby the said members are reciprocated.

3. Pump operating mechanism including a master gear provided at opposite sides with smooth and cogged portions, pump rods extending above and below the master gear and provided with racks and pinions meshing with the racks and arranged to be actuated at intervals by the cogged portions of the master gear to impart a continuous reciprocatory movement to the pump rods.

4. Pump operating mechanism including a master gear provided at each side with cogged portions and smooth intervening portions, pump rods or members extending above and below the master gear and provided at opposite sides with racks, and pinions arranged in pairs above and below the master gear and having a continuous meshing engagement with the pump rods and arranged to be engaged and actuated at intervals by the cogged portions of the master gear to impart a reciprocatory motion to the pump rods or members.

In testimony whereof I affix my signature.

BRYNTE BRYNTESON.

Copies of this patent may be obtained for five cents each, by addressing the "Commissioner of Patents, Washington, D. C."